United States Patent
Shigenaga et al.

(10) Patent No.: US 8,712,670 B2
(45) Date of Patent: Apr. 29, 2014

(54) CONTROLLER FOR INTERNAL COMBUSTION ENGINE

(75) Inventors: Masahiro Shigenaga, Nishio (JP); Kimitaka Saitoh, Nagoya (JP); Masatoshi Basaki, Nukata-gun (JP); Kiyohiko Watanabe, Okazaki (JP); Makoto Miwa, Kariya (JP)

(73) Assignee: Denso Corporation, Kariya (JP)

( * ) Notice: Subject to any disclaimer, the term of this patent is extended or adjusted under 35 U.S.C. 154(b) by 1159 days.

(21) Appl. No.: 12/645,769

(22) Filed: Dec. 23, 2009

(65) Prior Publication Data

US 2010/0161203 A1 Jun. 24, 2010

(30) Foreign Application Priority Data

Dec. 24, 2008 (JP) ................................. 2008-327736

(51) Int. Cl.
- *B60T 7/12* (2006.01)
- *G05D 1/00* (2006.01)
- *G06F 7/00* (2006.01)
- *G06F 17/00* (2006.01)

(52) U.S. Cl.
USPC ........................................................ 701/104

(58) Field of Classification Search
USPC ............. 123/90.15, 90.16, 90.17, 90.18, 294, 123/305, 406.29, 406.3, 406.45, 435, 479, 123/480, 674; 701/101, 102, 103, 104
See application file for complete search history.

(56) References Cited

U.S. PATENT DOCUMENTS

| | | | |
|---|---|---|---|
| 6,994,073 B2 | 2/2006 | Tozzi et al. | |
| 7,156,070 B2 * | 1/2007 | Strom et al. | 123/304 |
| 7,194,996 B2 * | 3/2007 | Koopmans | 123/295 |
| 7,210,457 B2 | 5/2007 | Kuzuyama | |
| 2006/0272616 A1 * | 12/2006 | Kuzuyama | 123/435 |
| 2007/0151542 A1 * | 7/2007 | Yamaguchi et al. | 123/299 |
| 2008/0000446 A1 * | 1/2008 | Strom et al. | 123/295 |

* cited by examiner

*Primary Examiner* — Stephen K Cronin
*Assistant Examiner* — Sizo Vilakazi
(74) *Attorney, Agent, or Firm* — Nixon & Vanderhye P.C.

(57) ABSTRACT

When a driving region of an engine is in a specified self-ignited combustion region, a valve timing is controlled in such a manner as to establish a negative valve overlap period in which an exhaust valve and an intake valve are closed. During the negative valve overlap period, a direct injection is performed to reform a fuel. After the direct injection, a port injection is performed to control an output. Thereby, a self-ignited combustion control is performed. During the self-ignited combustion control, a fuel reform degree of the fuel injected by the direct fuel injection is detected, and a self-ignited combustion condition in a present combustion cycle is estimated based on the fuel reform degree detected in the present combustion cycle. A fuel injection quantity of the intake port fuel injection is corrected according to the estimated self-ignited combustion condition in order to stabilize the self-ignited combustion condition.

8 Claims, 9 Drawing Sheets

# CONTROLLER FOR INTERNAL COMBUSTION ENGINE

CROSS-REFERENCE TO RELATED APPLICATION

This application is based on Japanese Patent Application No. 2008-327736 filed on Dec. 24, 2008, the disclosure of which is incorporated herein by reference.

FIELD OF THE INVENTION

The present invention relates to a controller for an internal combustion engine provided with a function in which air-fuel mixture is self-ignited to be combusted by compressing the air-fuel mixture during a compression stroke in a specified self-ignited combustion region.

BACKGROUND OF THE INVENTION

In order to reduce fuel consumption and a NOx emission, JP-2007-16777A (U.S. Pat. No. 7,210,457B2) and JP-2008-69788A (U.S. Pat. No. 6,994,073B2) show that an internal combustion engine is driven by a self-ignited combustion in which the air-fuel mixture is self-ignited to be combusted. Generally, in the self-ignited combustion, a combustion condition control is difficult and a stabilization of combustion condition is hard, compared with a spark-ignited combustion.

In a technology disclose by JP-2007-16777A and JP-2008-69788A, base on a characteristic in which an ion current is generated according to a combustion state of the air-fuel mixture, the self-ignited combustion condition is detected by detecting the ion current. Based on the detected combustion condition, a fuel injection quantity and a fuel injection timing are controlled in order to stabilize the self-ignited combustion condition.

However, in a system where the self-ignited combustion condition is detected to control the fuel injection quantity and the fuel injection timing based on the detected combustion condition, if the combustion condition in a combustion cycle is deteriorated, after a deterioration in the combustion condition is actually detected, the fuel injection quantity and the fuel injection timing are controlled in order to restrict the deterioration in combustion in a subsequent combustion cycle. Thus, it is likely that the control of the combustion condition is delayed and the self-ignited combustion can not be stabilized sufficiently.

SUMMARY OF THE INVENTION

The present invention is made in view of the above matters, and it is an object of the present invention to provide a controller which can stabilize the self-ignited combustion condition effectively.

According to the present invention, an internal combustion engine is provided with both of a direct fuel injector for a direct fuel injection and an intake port fuel injector for an intake port injection. Alternatively, the internal combustion engine is provided with only direct fuel injector for the direct fuel injection. A controller for the internal combustion engine includes a variable valve timing controller adjusting a valve timing of an intake valve and/or an exhaust valve and a self-ignited combustion control means. The self-ignited combustion control means controls the variable valve timing controller in such a manner as to establish a negative valve overlap period where the exhaust valve and the intake valve are closed at least in a posterior half of an exhaust stroke when a driving region of the internal combustion engine is in a specified self-ignited combustion region. The self-ignited combustion control means performs a fuel-reform injection in which the fuel is injected into a cylinder for reforming a fuel during the negative valve overlap period. The self-ignited combustion control means performs an output-control injection in which the fuel is injected into the intake port or the cylinder for controlling an output after the direct fuel injection is performed. The self-ignited combustion control means self-ignites an air-fuel mixture by compressing the air-fuel mixture in a compression stroke. Further, the controller includes a fuel reform degree detecting means for detecting a reform degree of the fuel injected into a cylinder by the fuel-reform injection. The self-ignited combustion control means corrects a fuel injection quantity of the output-control injection based on the reform degree of the fuel.

According to the above configuration, in the self-ignited combustion region, the valve timing is controlled in such a manner as to establish a negative valve overlap period where the exhaust valve and the intake valve are closed at least in a posterior half of an exhaust stroke. During the negative valve overlap period, since a high temperature combustion gas remaining in the cylinder is compressed by a piston in the posterior half of the exhaust stroke, the temperature and pressure in the cylinder are increased.

During the negative valve overlap period, the fuel-reform injection is performed so that the fuel is injected into the cylinder. The fuel injected into the cylinder for the reform is exposed to high temperature and high pressure. Thus, a preliminary reaction of the combustion is started and the fuel is reformed to a condition where the self-ignition is easily performed.

After the fuel-reform injection is performed, the output-control injection is performed to inject the fuel into the intake port or the cylinder. The fuel injected by the output-control injection and the reformed fuel injected by the fuel-reform injection form the air-fuel mixture in the cylinder. Then, when the interior of the cylinder becomes high-temperature by compression in the compression stroke, the reformed fuel is self-ignited to combust the air-fuel mixture. That is, the self-ignited combustion of the air-fuel mixture is performed.

When the self-ignited combustion control is performed, the self-ignitionability of the air-fuel mixture is varied and the self-ignited combustion condition is varied according to a reform degree of the fuel which is injected by the fuel-reform injection. The reform degree of the fuel represents a progress of the reform and a reformed fuel quantity. Thus, the combustion condition of the self-ignited combustion can be estimated based on the reform degree of the fuel.

The reform degree of the fuel injected by the fuel-reform injection is detected, and the fuel injection quantity of the output-control injection is corrected based on the reform degree of the fuel. Thereby, the self-ignited combustion condition detected in the present combustion cycle is estimated according to the reform degree of the fuel injected by the fuel-reform injection in the present combustion cycle. Based on the estimated self-ignited combustion condition, the fuel injection quantity of the output-control injection is corrected to control the self-ignited combustion condition, so that the self-ignited combustion condition is stabilized.

According to another aspect of the present invention, the self-ignited combustion control means performs a correcting fuel injection in which the fuel is injected into the intake port or the cylinder in order to correct the fuel injection quantity of the fuel-reform injection based on the reform degree of the fuel for correcting a fuel injection quantity of the output-control injection.

Thereby, the fuel injected by the direct fuel injection during the negative valve overlap period is combusted to drive the engine. When the fuel reform degree is small and the misfire may occur, the corrective fuel injection can be performed additionally in the same combustion cycle. In this case, the fuel injection quantity of the direct fuel injection may be increased in the successive combustion cycle.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Embodiments of the present invention will be described, hereinafter.

First Embodiment

Figure 1:
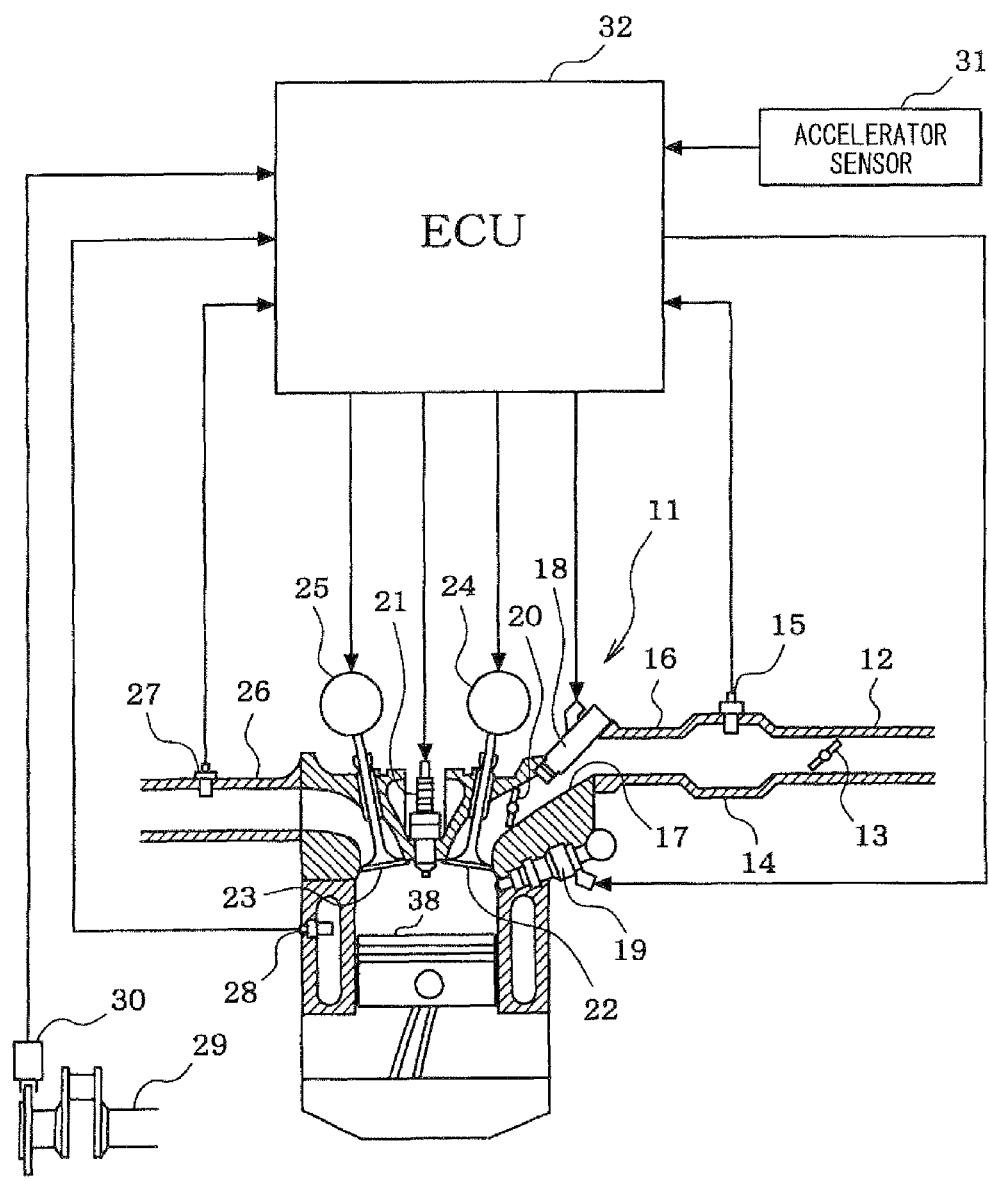
FIG. 1 is a schematic view of an engine control system according to a first embodiment of the present invention.

Referring to FIGS. 1 to 7, a first embodiment will be described hereinafter. Referring to FIG. 1, an engine control system is explained. An intake pipe 12 of an internal combustion engine 11 is provided with a throttle valve 13 which is driven by a motor (not shown). A surge tank 14 is provided downstream of the throttle valve 13. A pressure sensor 15 detecting an intake air pressure is disposed in the surge tank 14. An intake manifold 16 which introduces air into each cylinder of the engine 11 is connected to the surge tank 14.

The engine 11 is provided with a fuel injector 18 for an intake port injection and a fuel injector 19 for a direct injection. The fuel injector 18 injects the fuel into the intake port 17, and the fuel injector 19 injects the fuel into a cylinder directly. An air flow control valve 20 is disposed at each of the intake port 17 in order to control an air flow intensity (an intensity of swirl flow and an intensity of tumble flow) in each cylinder. A spark plug 21 is disposed for each of the cylinder on a cylinder head of the engine 11.

The engine 11 is provided with an intake-side variable valve timing controller 24 which adjusts a valve timing of the intake vale 22, and an exhaust-side variable valve timing controller 25 which adjusts a valve timing of the exhaust valve 23. An exhaust pipe 26 of the engine 11 is provided with an exhaust gas sensor 27 (an air-fuel ratio sensor, an oxygen sensor and the like). A catalyst (not shown) such as a three-way catalyst is arranged downstream of the exhaust gas sensor 27.

A coolant temperature sensor 28 detecting coolant temperature is fixed on the cylinder block of the engine 11. A crank angle sensor 30 is disposed at outer circumference of a crank shaft 30 to output a pulse signal every when the crank shaft 29 rotates a specified crank angle. Based on the output signal of the crank angle sensor 30, the crank angle and the engine speed are detected. Further, an accelerator sensor 31 detects an accelerator operation amount (stepped-amount of an accelerator pedal).

The outputs from the above sensors are inputted into an electronic control unit 32, which is referred to an ECU 32 hereinafter. The ECU 32 is mainly comprised of a microcomputer. A central processing unit (CPU) 33 executes various engine control programs stored in a read only memory (ROM) so that fuel injection quantities of the fuel injectors 18, 19 and an ignition timing of the spark plug 21 are controlled in accordance with an engine driving condition.

Figure 2:
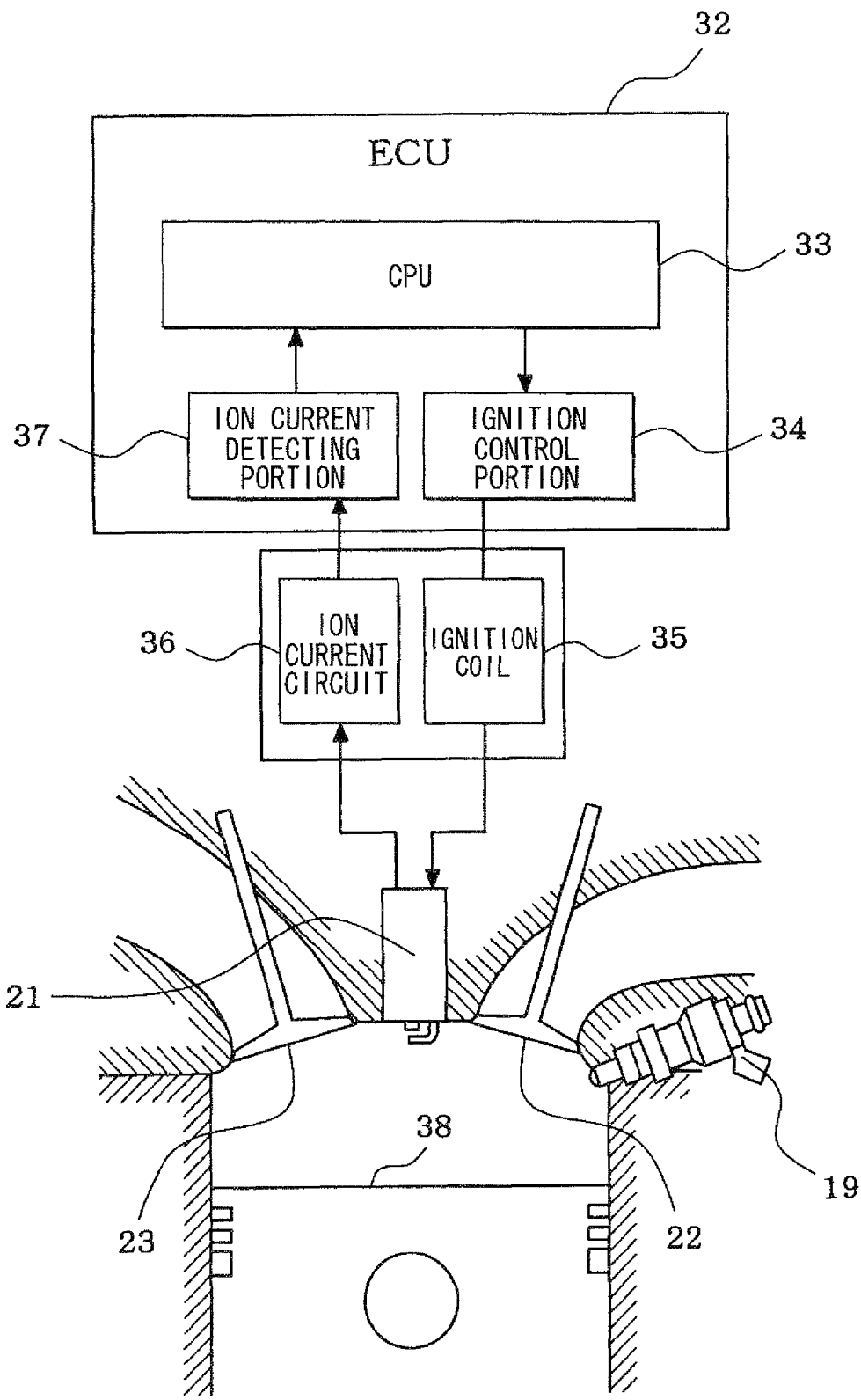
FIG. 2 is a schematic view of an ignition control system and an ion current detecting system.

As shown in FIG. 2, the ECU 32 outputs ignition signals from an ignition control portion 34 based on command signals from the CPU 33. When high voltage generated in an ignition coil 35 is applied to the spark plug 21 based on the ignition signal, a spark discharge is generated between electrodes of the spark plug 21 to ignite the air-fuel mixture in the cylinder. When an ion-current flows between the terminals of the spark plug 21 by an ion generated in reforming the injected fuel and an ion generated in combusting the air-fuel mixture, an ion-current signal is outputted from an ion current circuit 36. A voltage of the ion-current signal corresponds to the ion current. The ion-current signal is A-D converted in an ion current detecting portion 37 and sent to the CPU 33. In this case, the spark plug 21, the ion-current circuit 36, the ion-current detecting portion 37 and the like function as a combustion condition detecting means and a fuel reform degree detecting means.

Figure 5:
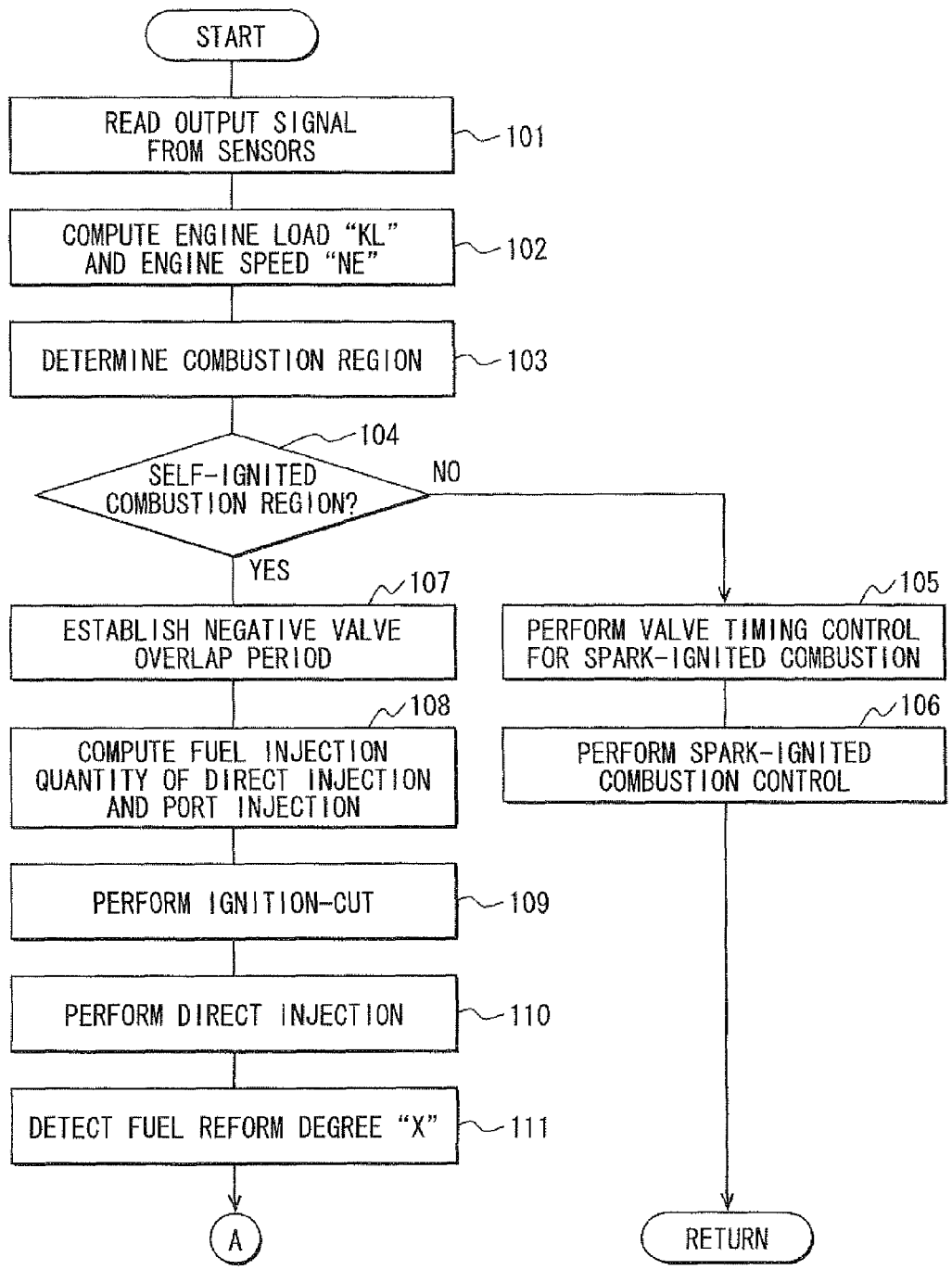
FIG. 5 is a first flowchart showing a combustion control routine according to the first embodiment.
Figure 6:
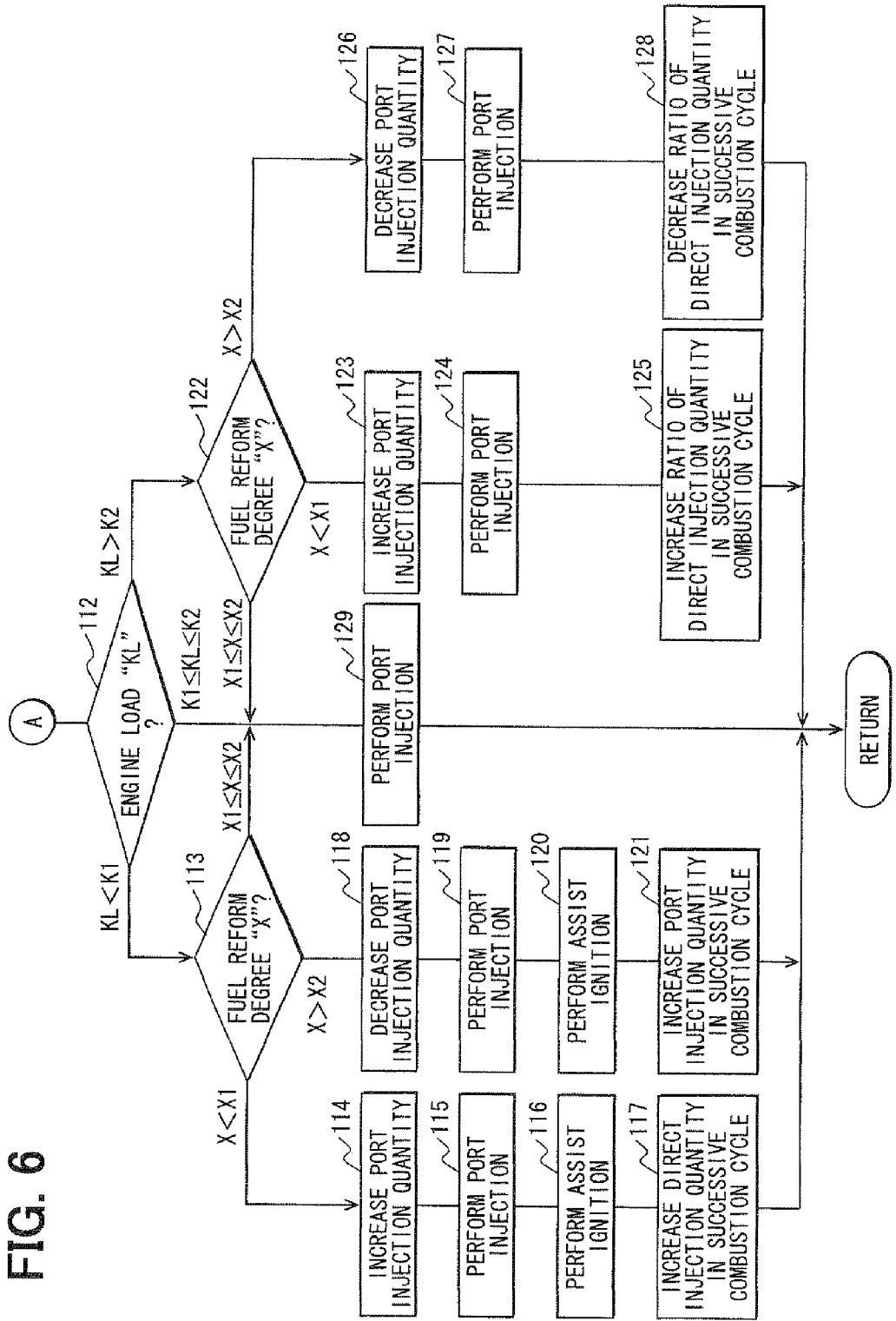
FIG. 6 is a second flowchart showing a combustion control routine according to the first embodiment.

The ECU 32 executes a combustion control routine shown in FIGS. 5 and 6. When the engine driving region is in a specified self-ignited combustion region (refer to FIG. 7), a self-ignited combustion control is performed so that the compressed air-fuel mixture is self-ignited and combusted. When the engine driving region is in a spark-ignited combustion region (refer to FIG. 7), a spark-ignited combustion is performed so that the fuel is ignited by the spark discharge of the spark plug 21.

Figure 3:
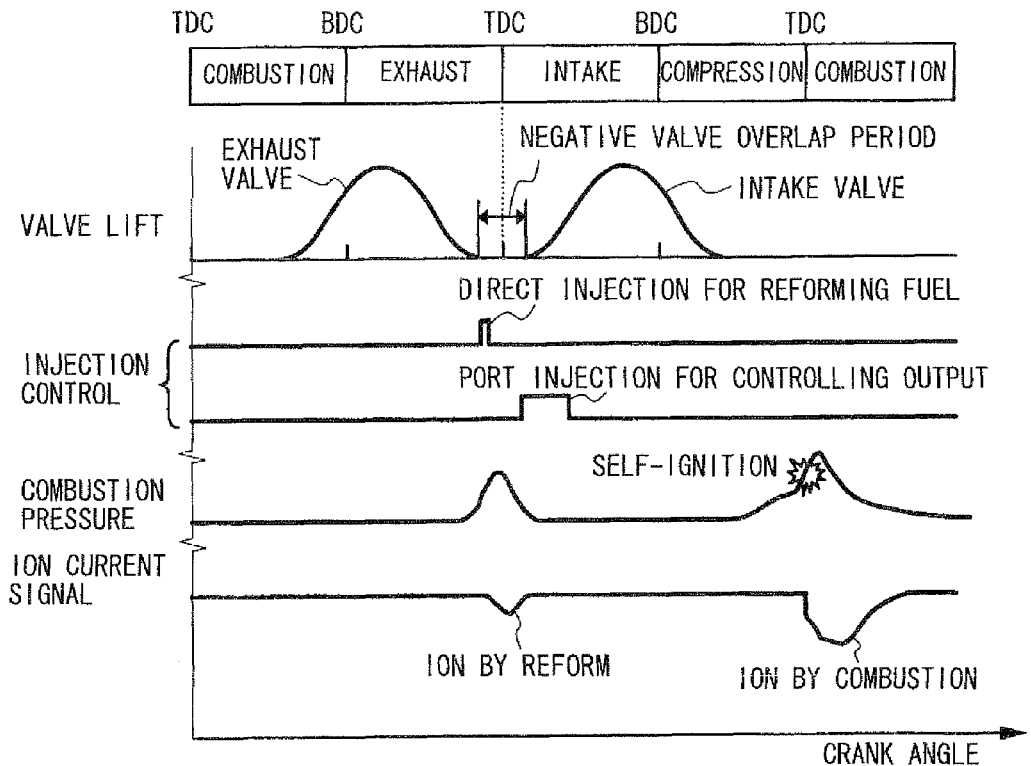
FIG. 3 is a time chart for explaining a self-ignited combustion control.

As shown in FIG. 3, in the self-ignited combustion control, the variable valve timing controllers 24, 25 control the valve timing of the intake valve 22 and the exhaust valve 23 to establish a negative valve overlap period in which both of the exhaust valve 23 and the intake valve 22 are closed from a posterior half of the exhaust stroke to an anterior half of the intake stroke. For example, the valve timing of the exhaust valve 23 is controlled to advance the closing timing of the exhaust valve 23 relative to a top dead center (TDC), and the valve timing of the intake valve 22 is controlled to retard the opening timing of the intake valve 22 relative to the top dead center. During the negative valve overlap period, since a high temperature combustion gas remaining in the cylinder is compressed by a piston 38 in the posterior half of the exhaust stroke, the temperature and the pressure in the cylinder are increased.

During the negative valve overlap period, the direct injection for reforming the fuel is performed so that the fuel injector 19 for the direct injection injects the fuel into the cylinder (injection for fuel reform). The fuel injected into the cylinder for the fuel reform is exposed to high temperature and high pressure. Thus, a preliminary reaction of the combustion is started and the fuel is reformed to a condition where the self-ignition is easily performed. Besides, the direct injection for reforming the fuel corresponds to a fuel-reform injection in the present embodiment.

In the intake stroke after the direct injection for reforming fuel is performed, a port injection for an engine output control (injection for controlling an engine output) is performed. The port injection for controlling engine output corresponds to an output-control injection, hereinafter. The fuel injector 18 for an intake port injection injects the fuel to the intake port 17. The fuel injected to the intake port 17 is suctioned into the cylinder. The fuel injected by the port injection for controlling engine output and the reformed fuel form the air-fuel mixture in a cylinder. Then, when the interior of the cylinder becomes high-temperature by compression in the compression stroke, the reformed fuel is self-ignited to combust the air-fuel mixture. That is, the self-ignited combustion of the air-fuel mixture is performed.

When the self-ignited combustion control is performed, the self-ignitionability of the air-fuel mixture is varied and the combustion condition of the self-ignited combustion is varied according to a reform degree of the fuel which is injected by the port injection for controlling engine output. The reform degree of the fuel represents a progress of the reform and a reformed fuel quantity. Thus, the combustion condition of the self-ignited combustion can be estimated based on the reform degree of the fuel.

According to the first embodiment, the reform degree of the fuel injected by the direct injection for reforming fuel is detected, and the current self-ignited combustion condition detected in the current combustion cycle is estimated according to the reform degree of the fuel. According to the estimated self-ignited combustion condition, the fuel injection quantity of the port injection for controlling engine output is corrected to control the self-ignited combustion condition, so that the self-ignited combustion condition is stabilized.

Figure 4:
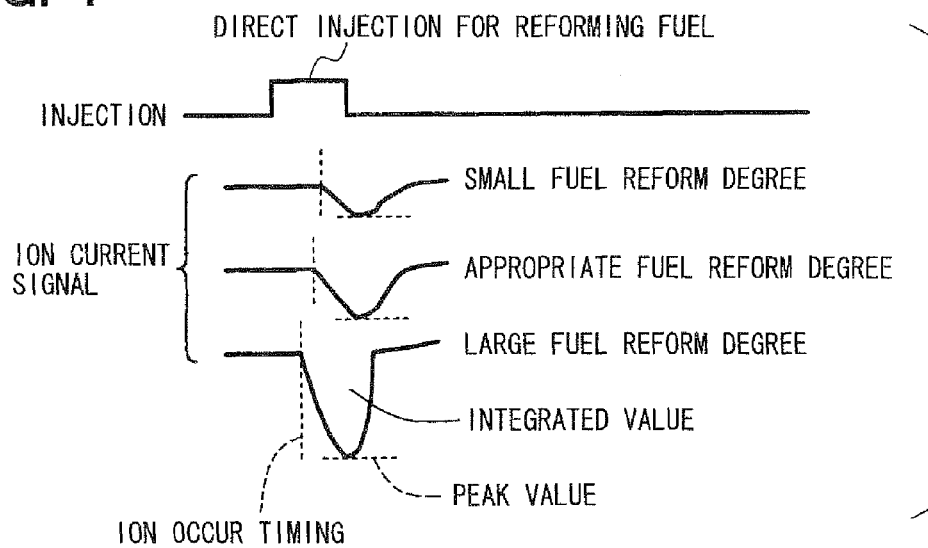
FIG. 4 is a chart for explaining a detecting method of a fuel reform degree.

As shown in FIG. 4, since the ion quantity generated in the cylinder is varied and the ion-current is varied according to the reform degree of the fuel injected by the direct injection for reforming fuel, the ion-current is an information which indicates the reform degree of the fuel with high accuracy. According to the first embodiment, the ion-current which is generated according to the reform degree of the fuel injected by the direct injection for reforming fuel is detected through the electrodes of the spark plug 21, and an integrated value (absolute value) of the ion-current signal is used as an information indicating the reform degree of the fuel. In this case, according as the reform degree of the fuel becomes larger, the ion quantity is increased and the integrated value of the ion-current signal becomes large. According as the reform degree of the fuel becomes smaller, the ion quantity is decreased and the integrated value of the ion-current signal becomes small. The self-ignited combustion control described above is executed by the ECU 32 according to a combustion control routine shown in FIGS. 5 and 6. The processes of the combustion control routine will be described hereinafter.

The combustion control routine shown in FIGS. 5 and 6 is repeatedly executed in a specified cycle while the ECU 32 is ON. This combustion control routine corresponds to a self-ignited combustion control means. In step 101, the output signals from the accelerator sensor 31, the crank angle sensor 30 and the like are read. In step 102, an accelerator position is computed based on the output signals from the accelerator sensor 31. The accelerator position is used as an engine load KL, and an engine speed NE is computed based on the output signals from the crank angle sensor 30. Besides, an intake air quantity and an intake air pressure can be used as the engine load KL.

Figure 7:
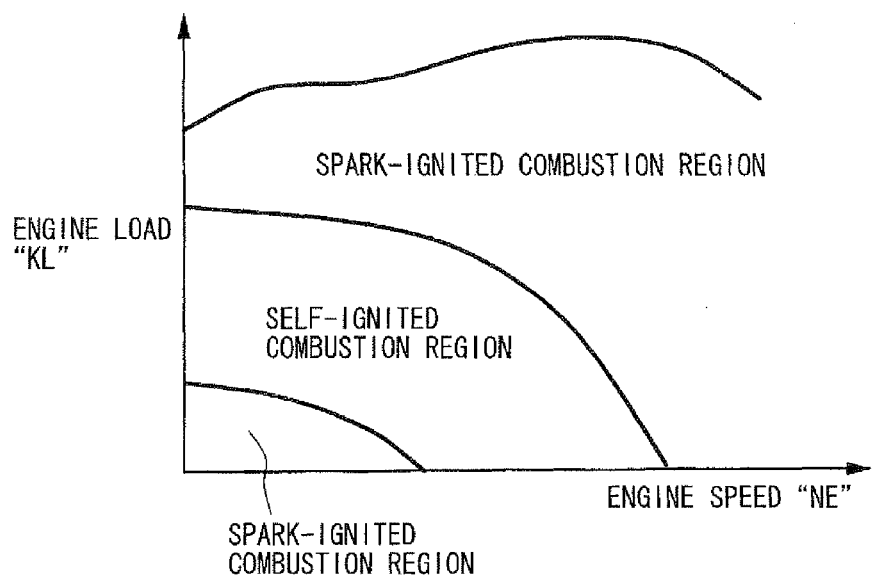
FIG. 7 is a chart conceptually showing a combustion region determination map.

Then, the procedure proceeds to step 103 in which the ECU 32 determines whether a present engine driving region (engine load KL and engine speed NE) is in the self-ignited combustion region or the spark-ignited combustion region with reference to a combustion region determining map shown in FIG. 7. The combustion region determining map shown in FIG. 7 is previously formed based on a design data, an examination data, simulation data and the like, and stored in the ROM of the ECU 32. In the combustion region determining map, a driving region in which the self-ignited combustion is difficult (for example, low speed and low load region, high speed region, and high load region) is set as the spark-ignited combustion region. A driving region in which the self-ignited combustion is possible (middle speed region, middle load region) is set as the self-ignited combustion region.

Then, the procedure proceeds to step 104 in which the ECU 32 determines whether the present driving region is the self-ignited combustion region based on a determination result in step 103. When the answer is NO in step 104, the procedure proceeds to step 105 in which the valve timing control for the spark-ignited combustion is performed. In the valve timing control for the spark-ignited combustion, the variable valve timing controllers 24, 25 control the valve timings of the intake valve 22 and the exhaust valve 23 according to the present engine driving region.

Then, the procedure proceeds to step 106 in which fuel injection quantity of the fuel injectors 18, 19 is controlled according to the present engine driving region (for example, engine load KL and engine speed NE), and the spark-ignited combustion control is performed by controlling the ignition timing of the spark plug 21 according to the present engine driving region When the answer is YES in step 104, the self-ignited combustion control is performed as follows. In step 107, the variable valve timing controllers 24, 25 control the valve timing of the intake valve 22 and the exhaust valve 23 to establish the negative valve overlap period in which both of the exhaust valve 23 and the intake valve 22 are closed from a posterior half of the exhaust stroke to an anterior half of the intake stroke.

Then, the procedure proceeds to step 108 in which the fuel injection quantity of the direct injection for reforming fuel and the fuel injection quantity of the port injection for controlling engine output are computed according to the present engine driving region by use of a map or a formula. This map or the formula is previously formed based on a design data, an experiment data, and a simulation data to be stored in the ROM of the ECU 32.

Then, the procedure proceeds to step 109 in which an ignition-cut is performed to stop the ignition by a spark discharge of the spark plug 21. In step 110, the direct injection for reforming fuel is performed during the negative valve overlap period.

Then, the procedure proceeds to step 111 in which the reform degree X of the fuel injected by the direct injection for reforming fuel is detected. Specifically, the ion-current which is generated according to the reform degree of the fuel injected by the direct injection for reforming fuel is detected through the electrodes of the spark plug 21, and an integrated value of the ion-current signal is used as an information indicating the reform degree of the fuel.

Then, the procedure proceeds to step 112 in FIG. 6 in which the ECU 32 determines whether the present engine load KL is in a specified appropriate range (K1≤KL≤K2). When the ECU 32 determines that the present engine load KL is less than a lower limit value K1 (KL<K1), the procedure proceeds to step 113 in which the ECU 32 determines whether the fuel reform degree X is in a specified appropriate range (X1≤X≤X2).

When the ECU 32 determines that the engine load KL is less than the lower limit value K1 (KL<K1) in step 112 and the fuel reform degree X is less than the lower limit value X1 (X<X1) in step 113, the fuel reform has not been conducted sufficiently and the self-ignition of the air-fuel mixture hardly occurs. Thus, the ECU 32 estimates that the combustion condition becomes slower than the appropriate combustion condition or a misfire may occur. The procedure proceeds to step 114 in which the fuel injection quantity of the port injection for controlling engine output in the present combustion cycle is corrected so as to be increased.

Then, the procedure proceeds to step 115 in which the port injection for controlling engine output is performed in the intake stroke. In step 116, an assist ignition by a spark discharge of the spark plug 21 is performed at a specified assist ignition timing (for example, an estimated occurrence timing of the self-ignition). Thereby, the self-ignited combustion is expedited to be appropriate combustion so that a misfire is prevented. Then, the procedure proceeds to step 117 in which the the fuel injection quantity of the direct injection for reforming fuel in successive combustion cycle is corrected so as to be increased so that a fuel reform degree X in a successive combustion cycle is in an appropriate range.

When the ECU 32 determines that the engine load KL is less than the lower limit value K1 (KL<K1) in step 112 and the fuel reform degree X is greater than the upper limit value X2 (X>X2) in step 113, the combustion in a previous combustion cycle is insufficient and unburned fuel remains in the cylinder. Since the unburned fuel is reformed during the negative valve overlap period in the present combustion cycle, the fuel reform degree X (ion quantity) is increased and the self-ignition of the air-fuel mixture excessively easily occurs. Thus, the ECU 32 estimates that a rapid combustion may occur and a knocking may occur. The procedure proceeds to step 118 in which the fuel injection quantity of the port injection for controlling engine output in the present combustion cycle is corrected so as to be decreased.

Then, the procedure proceeds to step 119 in which the port injection for controlling engine output is performed in the intake stroke. In step 120, the assist ignition by the spark discharge of the spark plug 21 is performed at a specified assist ignition timing. Thereby, the self-ignited combustion is restricted to be the appropriate combustion so that a knocking is restricted. Then, the procedure proceeds to step 121 in which the fuel injection quantity of the port injection for controlling engine output in the successive combustion cycle is corrected to be increased.

When the ECU 32 determines that the engine load KL is greater than the upper limit K2 (KL>K2) in step 112, the procedure proceeds to step 122 in which the ECU 32 determines whether the fuel reform degree X is in the appropriate range (X1≤X≤X2)

When the ECU 32 determines that the engine load KL is greater than the upper limit value K2 (KL>K2) in step 112 and the fuel reform degree X is less than the lower limit value X1 (X<X1) in step 122, the fuel reform has not been conducted sufficiently and the self-ignition of the air-fuel mixture hardly occurs. Thus, the ECU 32 estimates that the combustion condition becomes slower than the appropriate combustion condition. The procedure proceeds to step 123 in which the fuel injection quantity of the port injection for controlling engine output in the present combustion cycle is corrected so as to be increased. The procedure proceeds to step 124 in which the port injection for controlling engine output is performed in the intake stroke. Thereby, the self-ignited combustion is expedited to be appropriate combustion. Then, the procedure proceeds to step 125 in which a ratio of the fuel injection quantity of the direct injection for reforming fuel relative to the fuel injection quantity of the port injection for controlling engine output is increased in the successive combustion cycle in order that the fuel reform degree X in the successive combustion cycle is brought in the appropriate range.

When the ECU 32 determines that the engine load KL is greater than the upper limit value K2 (KL>K2) in step 112 and the fuel reform degree X is greater than the upper limit value X2 (X>X2) in step 122, the self-ignition of the air-fuel mixture excessively easily occurs and the ECU 32 estimates that a rapid combustion may occur and a knocking may occur. The procedure proceeds to step 126 in which the fuel injection quantity of the port injection for controlling engine output is corrected to be decreased. In step 127, the port injection for controlling engine output is performed in the intake stroke. Thereby, the self-ignited combustion is restricted to be the appropriate combustion and a knocking is restricted. In step 128, a ratio of the fuel injection quantity of the direct injection for reforming fuel relative to the fuel injection quantity of the port injection for controlling engine output is decreased so that the fuel reform degree X is within the appropriate range in the successive combustion cycle.

When the ECU 32 determines that the engine load KL is within the appropriate range in step 112, or when the ECU 32 determines that the fuel reform degree X is within the appropriate range (X1≤X≤X2) in step 113 or step 122, the procedure proceeds to step 129 in which the port injection for controlling engine output is performed without correcting the fuel injection quantity of the port injection for controlling engine output.

According to the first embodiment, in the self-ignited combustion region, the valve timing is controlled so that the negative valve overlap period is established. During the negative valve overlap period, the direct injection for reforming fuel is performed and the port injection for controlling engine output is performed after the direct injection. Thereby, the self-ignited combustion control is performed. During the self-ignited combustion control, the fuel reform degree X of the fuel injected by the direct injection for reforming fuel is detected, the self-ignited fuel condition in the present combustion stroke is estimated based on the fuel reform degree X detected in the present combustion circle. The fuel injection quantity of the port injection for controlling engine output is corrected to control the self-ignited combustion condition according to the estimated self-ignited combustion condition. Thus, the self-ignited combustion condition can be stabilized effectively.

According to the first embodiment, the ion-current which is generated in accordance with the fuel reform degree of the fuel injected by the direct injection for reforming fuel is detected through the electrodes of the spark plug 21 and the integrate value of the ion-current signal is used as the information representing the fuel reform degree. Thus, the fuel reform degree can be detected by use of the spark plug 21. It is unnecessary to provide a new sensor for detecting the fuel reform degree.

Second Embodiment

Figure 8:
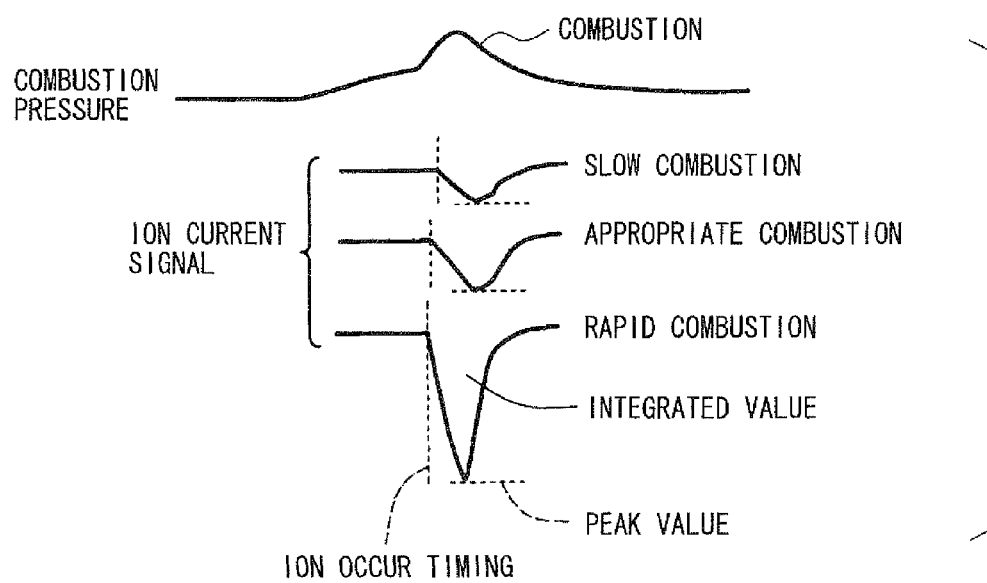
FIG. 8 is a chart for explaining a detecting method of a combustion condition.
Figure 9:
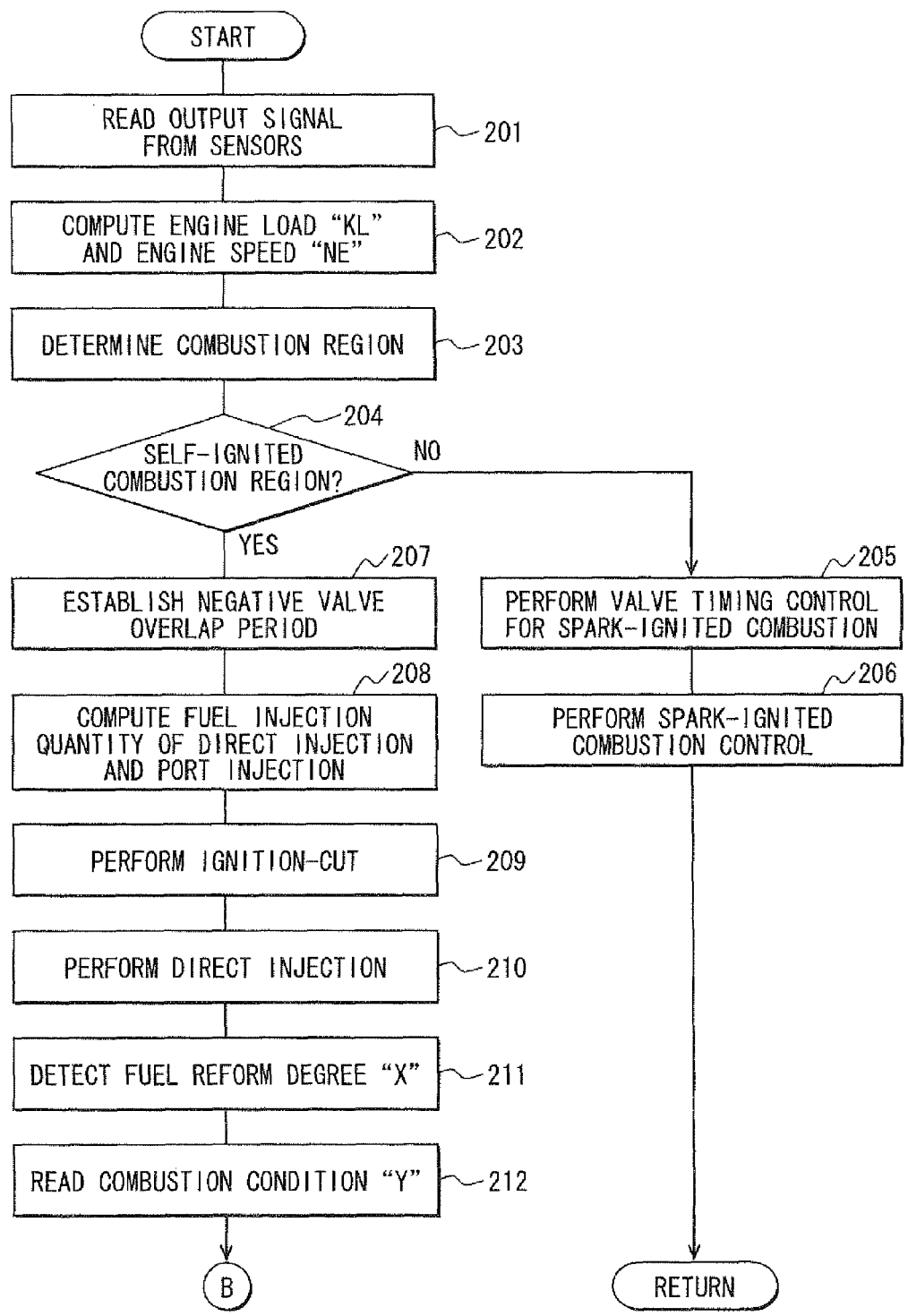
FIG. 9 is a first flowchart showing a combustion control routine according to a second embodiment.
Figure 10:
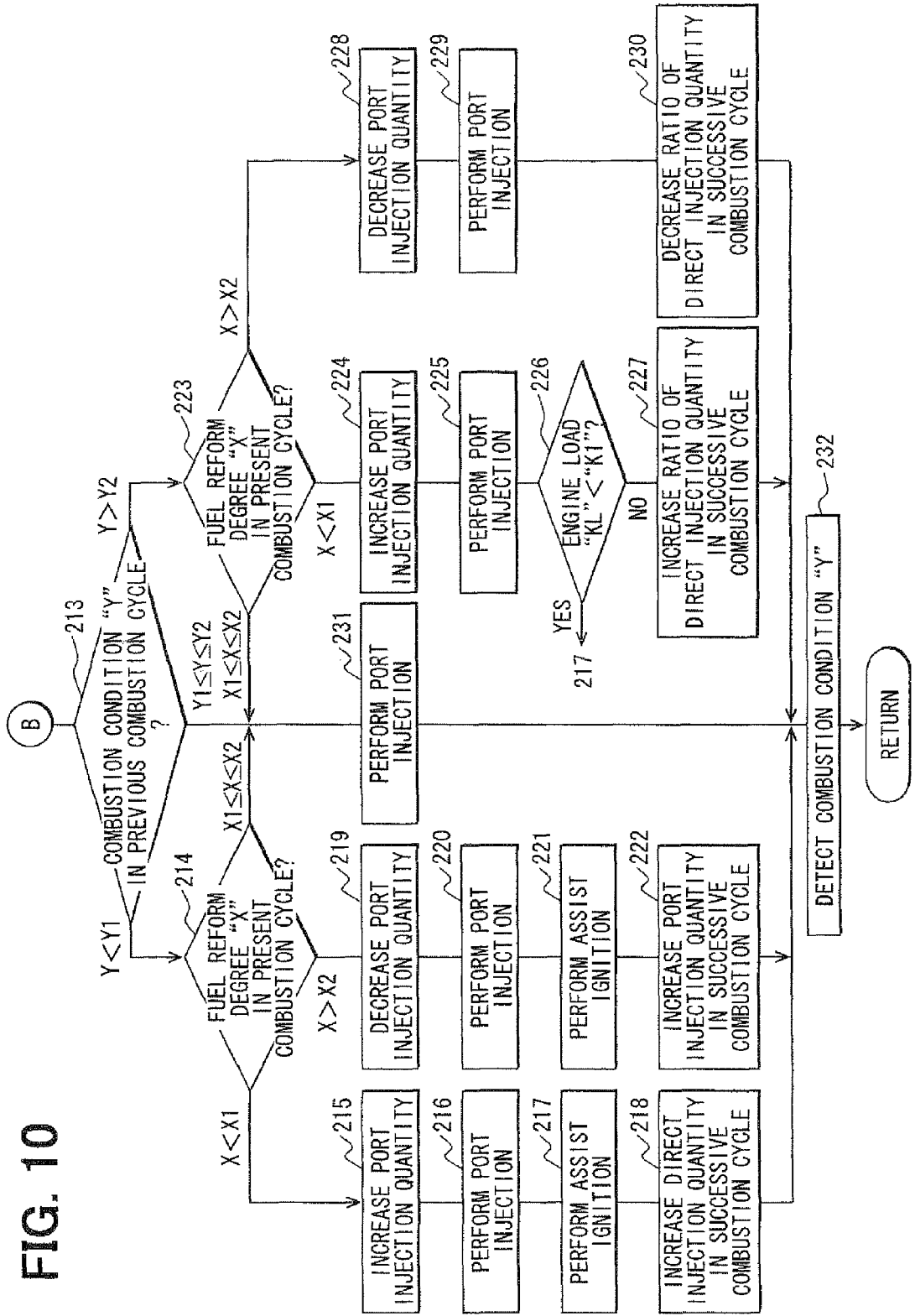
FIG. 10 is a second flowchart showing a combustion control routine according to the second embodiment.

Referring to FIGS. 8 to 10, a second embodiment will be described hereinafter. As to the same parts and components as those in the first embodiment, the same descriptions will not be reiterated.

As shown in FIG. 8, since the ion quantity generated in the cylinder according to the combustion condition is varied to vary the ion-current, the ion-current is information which represents the combustion condition accurately. According to the second embodiment, the ion-current generated in accordance with the combustion condition of the air-fuel ratio is detected through the terminals of the spark plug 21. The integrated value (absolute value) of the ion-current signal is used as the information representing the combustion condition. In this case, according as the combustion becomes rapid, the ion quantity is increased and the integrated value of the ion-current signal becomes large. According as the combustion becomes slow, the ion quantity is decreased and the integrated value of the ion-current signal becomes small.

The ECU 32 executes a combustion control routine shown in FIGS. 9 and 10. The self-ignited combustion condition in the present combustion cycle is estimated based on the combustion condition detected in the previous combustion cycle and the fuel reform degree detected in the previous combustion cycle. The fuel injection quantity of the port injection in the present combustion cycle, an existence or nonexistence of the assist ignition by the spark discharge of the spark plug 21 in the present combustion cycle, and a fuel injection quantity of the direct injection in the successive combustion cycle are controlled according to the estimated self-ignited combustion condition. The self-ignited combustion condition is controlled to be stabilized.

In the combustion control routine shown in FIGS. 9 and 10, the accelerator position is computed based on the output signal from the accelerator sensor 31. The computed accelerator position is used as the engine load KL. The engine speed NE is computed based on the output signal from the crank angle sensor 30 (steps 201, 202). Besides, an intake air quantity and an intake air pressure can be used as the engine load KL.

Then, with reference to the combustion region determining map shown in FIG. 7, the ECU 32 determines whether the present engine driving region (engine load KL and engine speed NE) is in the self-ignited combustion region (steps 203, 204). When the ECU 32 determines that the present engine driving condition is not in the self-ignited combustion region, the valve timing control for the spark-ignited combustion is performed in step 205 and the spark-ignited combustion control is performed in step 206 according to the present engine driving condition.

When the ECU 32 determines that the present engine driving condition is in the self-ignited combustion region, the self-ignited combustion condition is performed as follows. The valve timings of the intake valve 22 and the exhaust valve 23 are controlled to establish the negative valve overlap period in step 207, and then the fuel injection quantity of the direct injection for reforming fuel and the fuel injection quantity of the port injection for controlling engine output are computed in step 208 according to the present engine driving region, and the ignition-cut is performed in step 209.

Then, during the negative valve overlap period, the direct injection for reforming fuel is performed in step 210, and the fuel reform degree X of the fuel injected by the direct injection for reforming fuel is detected in step 211.

Then, the procedure proceeds to step 212 in which the ECU 32 reads the combustion condition Y (integrated value of the ion current signal) detected in the previous combustion cycle. Then, the procedure proceeds to step 213 in FIG. 10. In step 213, the ECU 32 determines whether the combustion condition Y in the previous combustion cycle is within a specified appropriate range ($Y1 \leq Y \leq Y2$). When the previous combustion condition Y of the previous combustion cycle is less than a lower limit value Y1 ($Y<Y1$), the procedure proceeds to step 214 in which the ECU 32 determines whether the fuel reform degree X of the present combustion cycle is within the appropriate range ($X1 \leq X \leq X2$).

When the ECU 32 determines that the combustion condition Y of the previous combustion cycle is less than the lower limit value Y1 ($Y<Y1$) of the appropriate range in step 213 and that the present fuel reform degree X is less than the lower limit value X1 ($X<X1$) in step 214, the fuel reform has not been conducted sufficiently and the self-ignition of the air-fuel mixture hardly occurs, which usually occurs in the low load region. Thus, the ECU 32 estimates that the combustion becomes slower than the appropriate combustion or the misfire may occur. The procedure proceeds to step 215 in which the fuel injection quantity of the port injection for controlling engine output in the present combustion cycle is corrected so as to be increased.

Then, the procedure proceeds to step 216 in which the port injection for controlling engine output is performed in the intake stroke. In step 217, the assist ignition is performed in a specified assist ignition timing. Thereby, the self-ignited combustion is expedited to be appropriate combustion and the misfire is avoided. Then, the procedure proceeds to step 218 in which the fuel injection quantity of the direct injection for reforming fuel in successive combustion cycle is corrected to be increased so that the fuel reform degree X is brought into the appropriate range in successive combustion cycle. Besides, if the self-ignited combustion condition is not improved even in the successive combustion cycles, the ECU 32 determines that the self-ignited combustion is difficult to be continued, so that the self-ignited combustion is switched into the spark-ignited combustion control.

When it is determined that the combustion condition Y is less than the lower limit value Y1 ($Y<Y1$) in step 213 and the fuel reform degree X is greater than the upper limit value X2 ($X>X2$) in step 214, the combustion in a previous combustion cycle is insufficient and unburned fuel remains in the cylinder. The unburned fuel is reformed during the negative valve overlap period in the present combustion cycle, the fuel reform degree (ion quantity) is increased, and the self-ignition of the air-fuel mixture easily occurs. Thus, the ECU 32 estimates that a rapid combustion occurs and a knocking occurs. The procedure proceeds to step 219 in which the fuel injection quantity of the port injection for controlling engine output in the present combustion cycle is corrected so as to be decreased.

Then, the procedure proceeds to step 220 in which the port injection for controlling engine output is performed in the intake stroke. In step 221, the assist ignition by the spark discharge of the spark plug 21 is performed at a specified assist ignition timing. Thereby, the self-ignited combustion is restricted to be the appropriate combustion in order to avoid a knocking. Then, the procedure proceeds to step 222 in which the fuel injection quantity of the port injection for controlling engine output in the successive combustion cycle is corrected so as to be increased.

When the ECU 32 determines that the combustion condition Y in the previous cycle is greater than the upper limit value Y2 ($Y>Y2$) in step 213, the procedure proceeds to step 223 in which the ECU 32 determines whether the fuel reform degree X in the present combustion cycle is within the appropriate range ($X1 \leq X \leq X2$).

When the ECU 32 determines that the combustion condition Y is greater than the upper limit value Y2 ($Y>Y2$) in step 213 and the fuel reform degree X is less than the lower limit value X1 ($X<X1$) in step 223, the fuel reform is not conducted sufficiently and the self-ignition of the air-fuel mixture hardly occurs. Thus, the ECU 32 estimates that the combustion becomes slower than the appropriate combustion or the misfire may occur. The procedure proceeds to step 224 in which the fuel injection quantity of the port injection for controlling engine output in the present combustion cycle is corrected so as to be increased.

Then, the procedure proceeds to step 225 in which the port injection for controlling engine output is performed in the intake stroke. In step 226, the ECU 32 determines whether the engine load KL is less than the lower limit value K1 (KL<K1). When the ECU 32 determines that the engine load KL is less than the lower limit value K1, the procedure proceeds to step 217 in which the assist ignition by the spark discharge of the spark plug 21 is performed in a specified assist ignition timing. Thereby, the self-ignited combustion is expedited to be appropriate combustion and the misfire is avoided. Then, the procedure proceeds to step 218 in which the fuel injection quantity of the port injection for controlling engine output in the successive combustion cycle is corrected so as to be increased.

When the ECU 32 determines that the engine load KL is greater than the lower limit value K1 in step 226, the procedure proceeds to step 227 in which the ratio of the fuel injection quantity of the direct injection for reforming fuel relative to the fuel injection quantity of the port injection for controlling engine output is increased in the successive combustion.

When the ECU 32 determines that the combustion condition Y in the previous combustion cycle is greater than the upper limit value Y2 in step 213 and the fuel reform degree X in the previous combustion cycle is less than the upper limit value X2 in step 223, the self-ignition of the air-fuel mixture extremely easily occurs. The ECU 32 estimates that a rapid combustion may occur and a knocking may occur. The procedure proceeds to step 228 in which the fuel injection quantity of the port injection for controlling engine output in the present combustion cycle is corrected so as to be decreased. In step 229, the port injection for controlling engine output is performed in the intake stroke. Thereby, the self-ignited combustion is restricted to be appropriate combustion and the knocking is restricted. Then, the procedure proceeds to step 230 in which the ratio of the fuel injection quantity of the direct injection for reforming fuel relative to the fuel injection quantity of the port injection for controlling engine output is decreased in the successive combustion cycle.

When the ECU 32 determines that the combustion condition Y in the previous combustion cycle is within the appropriate range (Y1≤Y≤Y2) in step 213 or when the ECU 32 determines that the fuel reform degree X in the present combustion cycle is within the appropriate range (X1≤X≤X2) in step 214 or step 223, the procedure proceeds to step 231 in which the port injection for controlling engine output is performed in the intake stroke.

Then, the procedure proceeds to step 232 in which the combustion condition Y in the present combustion cycle is detected. Specifically, the ion-current generated according to the combustion condition of the air-fuel mixture is detected through the electrodes of the spark plug 21, and the integrated value of the ion-current signal is used as the information indicating the combustion condition.

According to the second embodiment described above, the self-ignited combustion condition in the present combustion cycle can be accurately estimated based on the combustion condition detected in the previous combustion cycle and the fuel reform degree detected in the present combustion cycle. The fuel injection quantity of the port injection for controlling engine output in the present combustion cycle, the assist ignition by the spark discharge of the spark plug 21 in the present combustion cycle, and the fuel injection quantity of the direct injection for reforming fuel in the successive combustion cycle are controlled according to the estimated self-ignited combustion condition. Thus, the self-ignited combustion condition can be stabilized effectively.

Furthermore, according to the second embodiment, the ion-current is detected through the electrodes of the spark plug 21, and the integrated value of the ion-current signal is used as the information indicating the combustion condition. Thus, it is unnecessary to provide a new sensor for detecting the combustion condition.

Other Embodiments

In the self-ignited combustion control of the first embodiment, the negative valve overlap period can be varied according to the fuel reform degree.

Specifically, when the ECU 32 determines that the engine load KL is less than the lower limit value K1 (KL<K1) and the fuel reform degree X is less than the lower limit value X1 (X<X1), the fuel reform is not conducted sufficiently during the negative valve overlap period. Thus, in the successive combustion cycle, the closing timing of the exhaust valve 23 is advanced and the negative valve overlap period is increased so that the fuel reform is conducted sufficiently to bring the fuel reform degree X within the appropriate range.

When the ECU 32 determines that the engine load KL is less than the lower limit value K1 (KL<K1) and the fuel reform degree X is greater than the upper limit value X2 (X>X2), a closing timing of the exhaust valve 23 is retarded and the opening timing of the intake valve 22 is advanced to decrease the negative valve overlap period. The fuel reform is restricted during the negative valve overlap period to bring the fuel reform degree X within the appropriate range.

When the ECU 32 determines that the engine load KL is greater than the upper limit value K2 (KL>K2) and the fuel reform degree X is less than the lower limit value X1 (X<X1), the fuel reform is not conducted sufficiently during the negative valve overlap period. Thus, in the successive combustion cycle, the closing timing of the exhaust valve 23 is advanced and the opening timing of the intake valve 22 is retarded to increase the negative valve overlap period. The fuel reform is conducted sufficiently to bring the fuel reform degree X within the appropriate range.

When the ECU 32 determines that the engine load KL is greater than the upper limit value K2 (KL>K2) and the fuel reform degree X is greater than the upper limit value X2 (X>X2), more intake air quantity is required. Thus, in the successive combustion cycle, the closing timing of the exhaust valve 23 is retarded to decrease the negative valve overlap period so that the intake air quantity is increased.

In the self-ignited combustion control of the first embodiment, the opening degree of the air flow control valve 20 can be varied according to the fuel reform degree.

Specifically, when the ECU 32 determines that the engine load KL is less than the lower limit value K1 (KL<K1) and the fuel reform degree X is less than the lower limit value X1 (X<X1), the fuel reform is not conducted sufficiently and a misfire may occur. The ECU 32 determines that it is preferable not to generate the air flow (swirl flow and tumble flow) in a cylinder or to reduce the air flow intensity. The opening degree of the air flow control valve 20 is controlled in such a manner that the air flow is not generated or the air flow intensity is reduced.

When the ECU 32 determines that the engine load KL is greater than the upper limit value K2 (KL>K2) and the fuel reform degree X is less than the lower limit value X1 (X<X1), it is likely that a rapid combustion may occur. The ECU 32 determines it is necessary to restrict the rapid combustion by stratifying the air-fuel mixture in the cylinder. The opening degree of the air flow control valve 20 is controlled in such a manner that the air flow is generated or the air flow intensity is increased.

In the first and the second embodiment, the ion-current is detected through the electrodes of the spark plug 21 and the integrated value of the ion-current signal is used as the information indicating the fuel reform degree or the combustion condition. However, as shown in FIGS. 4 and 8, a peak value (absolute value) of the ion-current signal may be used as the information indicating the fuel reform degree or the combustion condition. In this case, as shown in FIG. 4, according as the fuel reform degree becomes larger, the ion quantity is increased and the peak value of the ion-current signal becomes larger. According as the fuel reform degree becomes smaller, the ion quantity is decreased and the peak value of the ion current signal becomes smaller. Besides, as shown in FIG. 8, according as the combustion becomes rapid, the ion quantity is increased and the peak value of the ion current signal becomes larger. According as the combustion becomes slow, the ion quantity is decreased and the peak value of the ion current signal becomes smaller.

Alternatively, as shown in FIGS. 4 and 8, a trailing edge of the ion current signal can be used as the information indicating the fuel reform degree or the combustion condition. In this case, as shown in FIG. 4, according as the fuel reform degree becomes larger, the ion generating timing becomes earlier. According as the fuel reform degree becomes smaller, the ion generating timing becomes later. Besides, as shown in FIG. 8, according as the combustion becomes rapid, the ion generating timing becomes earlier. According as the combustion becomes slow, the ion generating timing becomes later.

A rate of change or a trajectory length of the ion current signal can be used as the information indicating the fuel reform degree or the combustion condition. A combustion pressure detected by a combustion pressure sensor can be used as the information indicating the fuel reform degree or the combustion condition. An emission of light by an intermediate product at the fuel reform or an emission of light by the combustion is detected by an optical sensor, and a detected light intensity can be used as the information indicating the fuel reform degree or the combustion condition. Since a gas component (for example, methane quantity) in the cylinder is varied due to the fuel reform or the combustion, the gas component can be used as the information indicating the fuel reform degree or the combustion condition.

Besides, in the first and the second embodiment, the fuel injector 19 for the direct injection performs the direct injection for reforming fuel and the fuel injector 18 for the intake port injection performs the port injection for controlling engine output. When the present invention is applied to a system having only the fuel injector 19 for the direct injection, the fuel injector 19 may perform the direct injection for reforming fuel and the port injection for controlling engine output. Alternatively, when the present invention is applied to a system having two fuel injectors for direct injection for each cylinder, one of the fuel injectors performs the direct injection for reforming fuel and the other fuel injector performs the direct injection for controlling engine output.

The self-ignited combustion control of the present invention is not limited to be performed at a steady driving condition in the self-ignited combustion region. Considering that the combustion stability is deteriorated especially when the engine driving region is changed from the spark-ignited combustion region to the self-ignited combustion region, the self-ignited combustion control of the present invention may be performed at a transient driving period in which the engine driving region is changed from the spark-ignited combustion region to the self-ignited combustion region.

Figure 11:
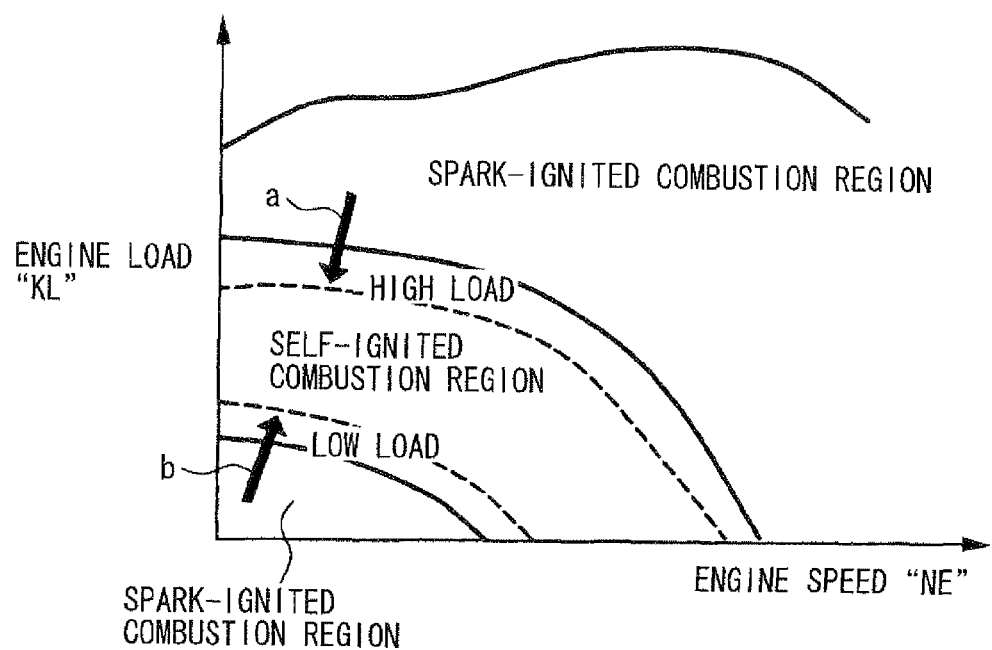
FIG. 11 is a graph for explaining other embodiments.

For example, as shown by an arrow "a" in FIG. 11, when the engine load KL is reduced and the combustion region is changed from the spark-ignited combustion to the self-ignited combustion, a cylinder temperature is sufficiently high. Thus, in a few cycles after the combustion region is changed to the self-ignited combustion region, the fuel injected by the direct injection for reforming fuel is easily reformed. Therefore, when the engine load KL is reduce to change the combustion region from the spark-ignited combustion region to the self-ignited combustion region, the self-ignited combustion control of the present invention is performed until the fuel reform degree becomes stable.

Besides, as shown by an arrow "b" in FIG. 11, when the engine load KL is increased and the combustion region is changed from the spark-ignited combustion to the self-ignited combustion, a cylinder temperature is low. Thus, in a few cycles after the combustion region is changed to the self-ignited combustion region, the fuel injected by the direct injection for reforming fuel is hardly reformed and a misfire may occur. Therefore, when the engine load KL is increased to change the combustion region from the spark-ignited combustion region to the self-ignited combustion region, the self-ignited combustion control of the present invention is performed until the fuel reform degree becomes stable to expedite the fuel reform.

Besides, according to the present invention, in the self-ignited combustion region, the valve timing is controlled to generate the negative valve overlap period. During the negative valve overlap period, the direct fuel injection is performed so that the self-ignited combustion control is performed. At this moment, the fuel reform degree of the fuel injected by the direct fuel injection is detected, and a corrective fuel injection may be performed to correct the fuel injection quantity of the direct fuel injection based on the fuel reform degree.

Thereby, the fuel injected by the direct fuel injection during the negative valve overlap period is combusted to drive the engine. When the fuel reform degree is small and the misfire may occur, the corrective fuel injection can be performed additionally in the same combustion cycle. In this case, the fuel injection quantity of the direct fuel injection may be increased in the successive combustion cycle.

What is claimed is:

1. A controller for an internal combustion engine which is provided with at least a direct fuel injector for a direct fuel injection, the controller comprising:

a variable valve timing controller adjusting a valve timing of an intake valve and/or an exhaust valve;

a self-ignited combustion control means for performing a self-ignited combustion of an air-fuel mixture by compressing the air-fuel mixture in a compression stroke when a driving region of the internal combustion engine is in a specified self-ignited combustion region; and a fuel reform degree detecting means for detecting a reform degree of the fuel injected into a cylinder by a fuel-reform injection, wherein the self-ignited combustion control means controls the variable valve timing controller in such a manner as to establish a negative valve overlap period where the exhaust valve and the intake valve are closed at least in a posterior half of an exhaust stroke, the self-ignited combustion control means performs the fuel-reform injection in which the fuel is injected into a cylinder for reforming a fuel during the negative valve overlap period, the self-ignited combustion control means performs an output-control injection in which the fuel is injected into the cylinder or an intake port for controlling an output of the internal combustion engine after the fuel-reform injection is performed, the self-ignited combustion control means corrects a fuel injection quantity of the output-control injection based on the reform degree of the fuel, and the reform degree of the fuel in a present combustion cycle is detected, and the fuel injection quantity of the output-control injection in the present combustion cycle is corrected based on the reform degree of the fuel.

2. A controller for an internal combustion engine according to claim 1, wherein the self-ignited combustion control means includes a correction means which corrects the fuel injection quantity of the output-control injection so as to be decreased when the reform degree of the fuel is greater than a specified appropriate range and corrects the fuel injection quantity of the output-control injection so as to be increased when the reform degree of the fuel is less than the specified appropriate range.

3. A controller for an internal combustion engine according to claim 1, wherein the self-ignited combustion control means includes an assist means which performs an assist ignition by a spark discharge of a spark plug when a load of the internal combustion engine is less than a specified range and the reform degree of the fuel is out of the specified appropriate range.

4. A controller for an internal combustion engine according to claim 1, further comprising a combustion condition detecting means for detecting a combustion condition of the air-fuel mixture, wherein the self-ignited combustion control means includes a control means which controls at least one of the fuel injection quantity of the output-control injection in a present combustion cycle, an existence or nonexistence of an assist ignition by a spark discharge of a spark plug in the present combustion cycle, and a fuel injection quantity of the fuel-reform injection in a successive combustion cycle based on the combustion condition in the previous combustion cycle and the reform degree of the fuel in the present combustion cycle.

5. A controller for an internal combustion engine according to claim 4, wherein the combustion condition detecting means detects an ion current, which is generated according to the combustion condition, through an electrode of the spark plug as an information indicating the combustion condition of the air-fuel mixture.

6. A controller for an internal combustion engine according to claim 1, wherein the fuel reform degree detecting means detects an ion current, which is generated according to the reform degree of the fuel, through an electrode of the spark plug as an information indicating the combustion condition of the air-fuel mixture.

7. A controller for an internal combustion engine according to claim 1, wherein the internal combustion engine is provided with both of the direct fuel injector for a direct fuel injection and an intake port fuel injector for an intake port injection, and the self-ignited combustion control means performs the fuel-reform injection with the direct fuel injector and performs the output-control injection with the intake port fuel injector.

8. A controller for an internal combustion engine which is provided with at least a direct fuel injector for a direct fuel injection, the controller comprising:

a variable valve timing controller adjusting a valve timing of an intake valve and/or an exhaust valve;

a self-ignited combustion control means for performing a self-ignited combustion of an air-fuel mixture by compressing the air-fuel mixture in a compression stroke when a driving region of the internal combustion engine is in a specified self-ignited combustion region; and a fuel reform degree detecting means for detecting a reform degree of the fuel injected into a cylinder by a fuel-reform injection, wherein the self-ignited combustion control means controls the variable valve timing controller in such a manner as to establish a negative valve overlap period where the exhaust valve and the intake valve are closed at least in a posterior half of an exhaust stroke, the self-ignited combustion control means performs the fuel-reform injection in which the fuel is injected into a cylinder for reforming a fuel during the negative valve overlap period, the self-ignited combustion control means performs an output-control injection in which the fuel is injected into the cylinder or an intake port for controlling an output of the internal combustion engine after the fuel-reform injection is performed, the self-ignited combustion control means corrects a fuel injection quantity of the output-control injection based on the reform degree of the fuel, the internal combustion engine is provided with both of the direct fuel injector for a direct fuel injection and an intake port fuel injector for an intake port injection, and the self-ignited combustion control means performs the fuel-reform injection with the direct fuel injector and performs the output-control injection with the intake port fuel injector.

* * * * *